US012809978B2

(12) United States Patent
Henkel et al.

(10) Patent No.: US 12,809,978 B2
(45) Date of Patent: Nov. 24, 2026

(54) MALWARE/OBFUSCATION DETECTION TECHNIQUE

(71) Applicant: CYLANCE INC., Plano, TX (US)

(72) Inventors: Steven John Henkel, Waterloo (CA); Aaron Mark Tresch Fienberg, Irvine, CA (US)

(73) Assignee: CYLANCE INC., Plano, TX (US)

( * ) Notice: Subject to any disclaimer, the term of this patent is extended or adjusted under 35 U.S.C. 154(b) by 44 days.

(21) Appl. No.: 18/973,409

(22) Filed: Dec. 9, 2024

(65) Prior Publication Data

US 2026/0161785 A1 Jun. 11, 2026

(51) Int. Cl.
*G06F 21/56* (2013.01)

(52) U.S. Cl.
CPC .......... *G06F 21/565* (2013.01); *G06F 21/564* (2013.01)

(58) Field of Classification Search
CPC .............................. G06F 21/565; G06F 21/564
See application file for complete search history.

(56) References Cited

U.S. PATENT DOCUMENTS

| | | | | |
|---|---|---|---|---|
| 11,042,637 | B1 * | 6/2021 | Davis | G06F 21/121 |
| 11,687,652 | B1 * | 6/2023 | Pinheiro | G06F 21/564 726/23 |
| 2017/0300691 | A1 | 10/2017 | Upchurch | |
| 2018/0285773 | A1 | 10/2018 | Hsiao et al. | |
| 2020/0082080 | A1 * | 3/2020 | Boulton | G06F 8/433 |
| 2020/0250309 | A1 | 8/2020 | Harang | |
| 2021/0342447 | A1 | 11/2021 | Sanzgiri et al. | |
| 2023/0141853 | A1 | 5/2023 | Vu et al. | |
| 2023/0281308 | A1 * | 9/2023 | Maimon | G06F 21/563 726/25 |
| 2023/0306113 | A1 | 9/2023 | Kim | |
| 2023/0342466 | A1 * | 10/2023 | Briliauskas | G06F 21/562 |
| 2024/0070273 | A1 * | 2/2024 | Almogbil | G06N 20/20 |
| 2024/0143753 | A1 * | 5/2024 | Zeng | G06F 21/6218 |

(Continued)

FOREIGN PATENT DOCUMENTS

| | | | | |
|---|---|---|---|---|
| CN | 115344875 | A | 11/2022 | |
| EP | 3654217 | A1 * | 5/2020 | H04L 63/145 |

OTHER PUBLICATIONS

Zhao et al, Malware classification based on visualization and feature fusion, 2021 IEEE Sixth International Conference on Data Science in Cyberspace (DSC), pp. 1-8 (Year: 2021).*

(Continued)

*Primary Examiner* — Christopher A Revak
(74) *Attorney, Agent, or Firm* — Fish & Richardson P.C.

(57) ABSTRACT

Systems, methods, and software can be used to store properties of binary files from a set of binary files. In some aspects, a method includes: obtaining features from the binary files; clustering the binary files based on a similarity measure between the features, wherein a cluster of binary files comprises binary files that are near duplicates to each other; determining for at least one pair of binary files of a given cluster, at least one sequence of bytes, a pair of binary file comprising a first binary file and a second binary file, and wherein the at least one sequence of bytes being a sequence of bytes present in the first binary file, but not in the second binary file; storing information related to the at least one sequence of bytes as a property of a binary file.

19 Claims, 6 Drawing Sheets

(56) References Cited

U.S. PATENT DOCUMENTS

2024/0259183 A1* 8/2024 Gamazo Sanchez ........................ H04L 9/0643
2024/0281531 A1* 8/2024 Taylor .................. G06F 21/566

OTHER PUBLICATIONS

Antoneac et al, Entropy-Driven Visualization in GView: Unveiling the Unknown in Binary File Formats, 2024 26th International Symposium on Symbolic and Numeric Algorithms for Scientific Computing (SYNASC), pp. 1-8 (Year: 2024).*
Hassen et al., "Malware classification using static analysis based features." Paper, Presented at 2017 IEEE symposium series on computational intelligence (SSCI), Honolulu, HI, USA, Nov. 27-Dec. 1, 2017, 7 pages.
International Search Report and Written Opinion in International Appln. No. PCT/US2025/056113, mailed on Feb. 13, 2026, 15 pages.
International Search Report and Written Opinion in International Appln. No. PCT/US2025/056127, mailed on Feb. 13, 2026, 15 pages.
Li et al., "Fileprints: Identifying file types by n-gram analysis." Paper, Presented at Proceedings from the Sixth Annual IEEE SMC Information Assurance Workshop. IEEE, West Point, NY, USA, Jun. 15-17, 2005, 8 pages.
Non-Final Office Action in U.S. Appl. No. 18/973,306, mailed on Apr. 2, 2026, 15 pages.

* cited by examiner

500

MALWARE/OBFUSCATION DETECTION TECHNIQUE

TECHNICAL FIELD

The present disclosure relates to the detection of a malware file and/or a potential obfuscated file.

BACKGROUND

In the field of cybersecurity, malware detection, especially when obfuscation techniques are used, is particularly difficult using classical methods of detection such as signature-based detection methods (which mainly consist in comparing a hash of the file against a database of hashes of known malware files), or entropy analysis methods (which measure the randomness in the file via the determination of an entropy value associated with a file; usually a high entropy value indicates that compression or encryption have been used which are bricks of obfuscation techniques).

Therefore, there is a need to detect efficiently that a file is a malware or that a file has been processed by an obfuscator (which could be a hint/indication of a potential threat related to this file).

DESCRIPTION OF DRAWINGS

Like reference numbers and designations in the various drawings indicate like elements.

DETAILED DESCRIPTION

Figure 1:
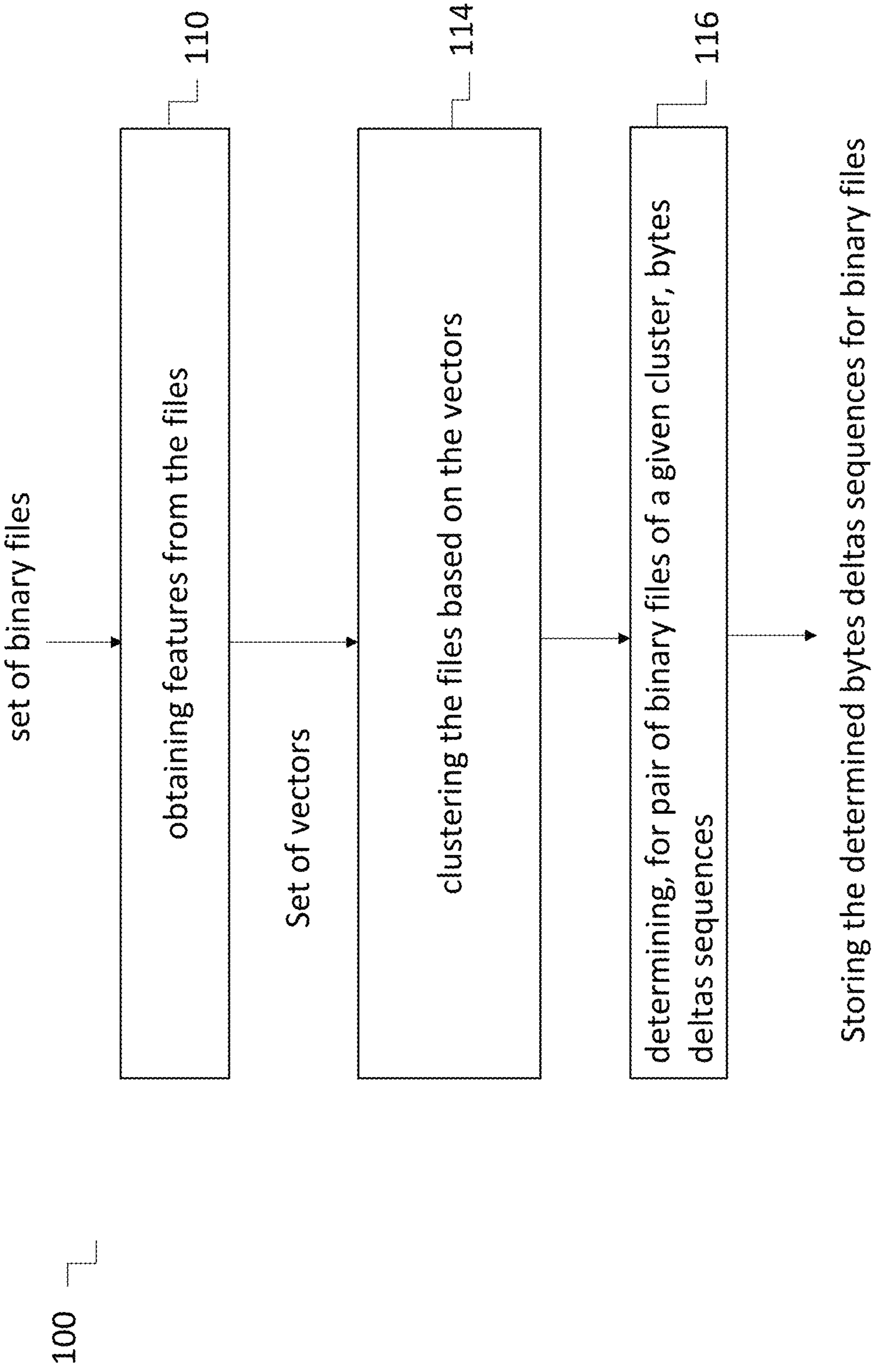
FIG. 1 is a flowchart showing an example method for storing properties of binary files from a set of binary files, according to an implementation.

FIG. 1 is a flowchart showing an example method 100 for storing properties of binary files from a set of binary files, according to an implementation.

For example, a device has access to a set of binary files in order to execute or to cause another device to execute one or more of the steps/operations described in connection with the FIG. 1.

Usually, a binary file (often also referred to as a binary or executable) is defined as a file that comprises data directly readable by a device's hardware or a virtual machine (typically in binary code, i.e., sequences of 0s and 1s) rather than in plain human-readable text. Most of binary files have a structured format or headers that provide information on how to read the data. There is a wide variety of binary files. For example, executable files (.exe, .bin, .dll) that comprise compiled code that the computer can execute directly represent a class of binary files. Executable files can either run standalone (like a program) or install software (like a setup or installer file) by unpacking and placing some necessary components in specific directories on a device. In addition, binary files or executable files require specific software or utilities for interpretation and are commonly opened by applications designed to handle their specific format. Another example of a binary file is a PE (Portable Executable) file or an ELF (Executable and Linkable Format) file, which are file formats used to store executable code and other data for programs on respectively Windows and Linux systems. They contain information necessary for the operating system to load and execute the program. Therefore, a binary file is a broad term that encompass any file that can be directly executed by a computer. For example, bytecodes that are intermediate code between source code and machine code can also be viewed as binary files. Indeed, even if bytecodes are not directly executed by the device's hardware, they can be considered as binary files as bytecodes are usually executed by a runtime environment (such as a Java Virtual Machine for Java bytecodes, or a Python interpreter for Python bytecodes). In addition, it should be noted that scripts written in languages like PowerShell can be compiled into binary executables. Indeed, tools like PyInstaller or py2exe can turn Python scripts into executable binaries. Attackers sometimes convert PowerShell or Python scripts into binary files to bypass script-blocking security tools. Therefore, binary files in this context can be associated with a lot of different high-level languages. Malicious scripts can be "packed" within a binary file using packers or obfuscators. The binary file may contain an embedded script that is unpacked or decrypted at runtime. Attackers use the binary representation approach to make it harder for signature-based antivirus to detect the script contents directly. Therefore, the analysis of binary files is an important aspect to take into consideration for protecting electronic devices. In the previous discussions, the examples of binary files were mainly related to computers. However, other electronic devices can use binary files. For example, Android Application Package (apk) files adopted by Android for apps distribution and installation can be viewed as binary files. Indeed, an .apk file is a container that holds compiled code in DEX (Dalvik Executable) format, which is used by Android's runtime to execute the app, with other components such as resources (i.e. images, sounds, and layouts), and manifest files that describe the app's structure and permissions. Another kind of binary files are iOS App Store Package (ipa) files which comprise compiled app code (in binary format for iOS devices' ARM architecture), as well as resources (images, audio, user interface files) and info.plist files comprising metadata about the app such as version information, permissions, configuration parameters, etc. The present disclosure can be applied to that kind of files.

In a variant, the device can have access to a set of source files. Then, the device can use a compiler to generate binary files from the set of source code files.

In another variant, the binary files can have a slightly different meaning. Indeed, according to this embodiment, the device can have access to a set of source files. But, instead of using a compiler, the device can convert the source code files into a kind of binary files (i.e. into files comprising only sequences of bits (that can be gathered into bytes) but these files cannot be executed by a device). For example, in a variant, text/instructions from the source code files are encoded into numerical values by using character's ASCII or UTF-8-byte representation. Hence, a source code file is converted into a binary file where each byte represents a character from the source code. In a variant, a source code file is parsed into an Abstract Syntax Tree (AST) which can then be serialized into binary. In another embodiment, a source code file is spitted into tokens or chunks/parts of the code, and hash functions can be applied on these tokens or chunks/parts of the code. Hence, for a given file, the concatenation of all the hashes defines a kind of a binary file. In a variant, a pre-trained transformer model (such as CodeBERT) specifically designed to handle source code for various natural language processing (NLP) tasks such as code search, code summarization, and code classification can be used. Indeed, according to this embodiment of the disclosure, such pre-trained transformer model can convert a source code file into a vector that can then be serialized into binary. Indeed, even if a vector outputted by a pre-trained transformer model comprises floating point values, it is possible to get a binary representation of these values by using a binary serialization technique. In a sense, this vector is converted into a sequence of 0s and 1s, as a binary file (but without the executable properties inherent to a binary file).

Whichever definition you choose, in the following description, a binary file covers these different interpretations.

In one embodiment of the disclosure, a device performs in a step 110 a processing on the set of binary files in order generate a set of vectors or features, wherein each binary file is associated with one or several vectors/features.

Figure 3:
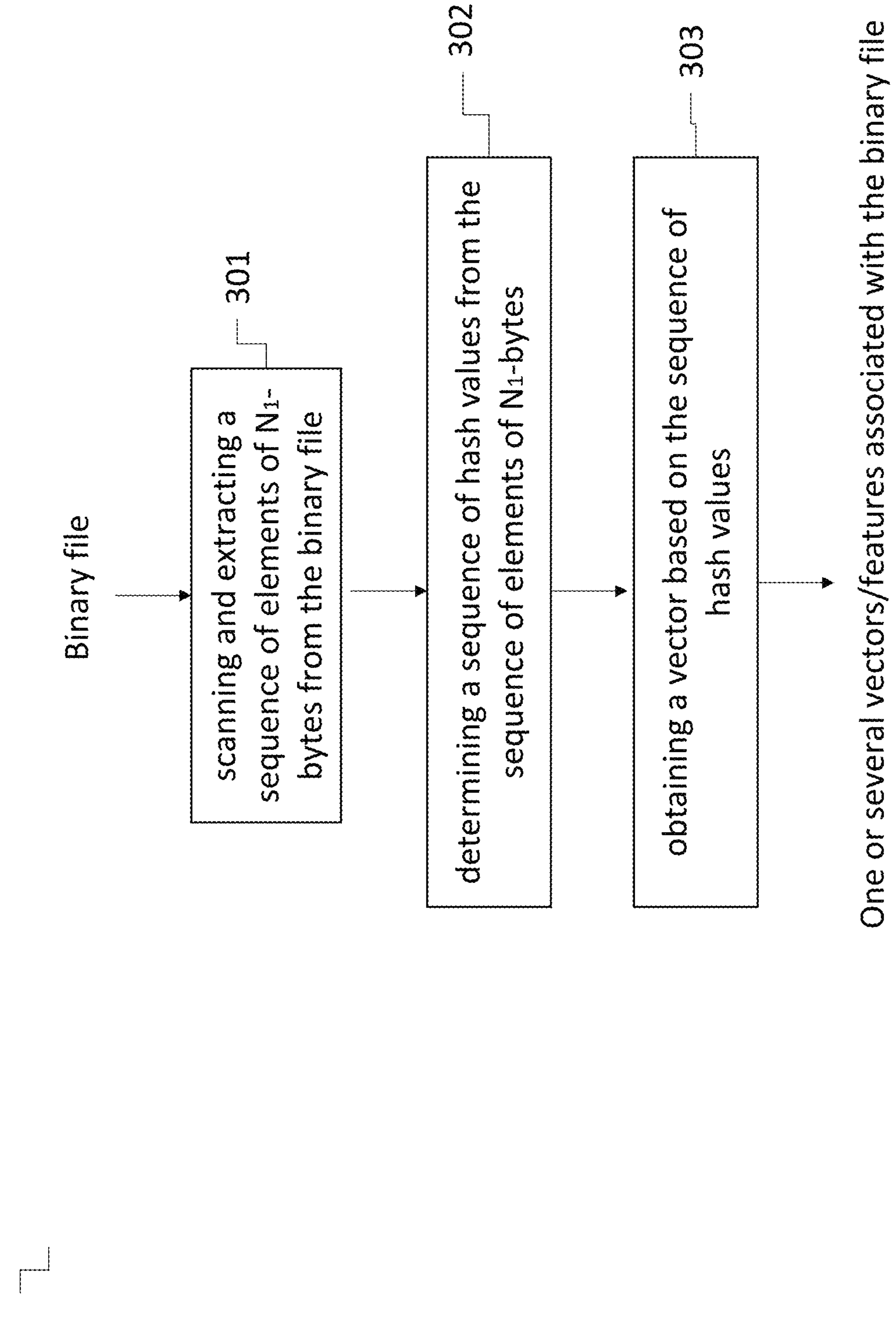
FIG. 3 is a flowchart presenting an example method for generating one or several vectors from a binary file, according to one embodiment of the disclosure.

For example, the processing 110 can comprise the execution of the method described in the FIG. 3.

In a variant, the processing 110 can also comprise the conversion of each binary file into a grey image, and these grey images are used as inputs of a trained Convolution Neural Network (CNN). In a variant, a trained Vision Transformer can be used instead of a trained CNN. In one implementation, a trained CNN can be combined with a transformer architecture in order to obtain a compact vector that represents or is associated with a binary file.

In another variant, the processing 110 can comprise the use of an encoder from a trained autoencoder. Therefore, the vector associated with a binary file correspond to the output of the encoder.

Once a set of vectors is obtained from the execution of step 110, a clustering of these vectors is done in a step 114.

In one implementation, a preprocessing step (i.e. executed before the clustering 114) is performed. For example, the preprocessing can comprise a normalization or scaling step.

The purpose of a clustering 114 is to generate clusters or groups of vectors based on similarity criteria.

In one embodiment, the clustering 114 comprises the use of a clustering technique such as the K-means clustering.

In a variant, a clustering technique such as Density-Based Spatial Clustering of Applications with Noise (DBSCAN) can be used. However, it should be noted that the DBSCAN technique is usually more suited for clustering data when clusters have a similar density. Therefore, a selecting step can be executed in order to choose amongst the possible clustering techniques which one to use. In one implementation, the selecting step comprises an evaluation of the repartition of the binary files according to their labels (if available). If a high disparity between the groups of files is identified, then the DBSCAN is not chosen to perform the clustering 114 on the set of vectors.

In a variant, a clustering technique relying on the use of Hierarchical Navigable Small World (HNSW) graphs and the performing of approximate nearest neighbor (ANN) searches can be done. Indeed, by building an index that efficiently organizes the data from the set of vectors, it possible to perform fast ANN searches.

In one implementation, dimensionality reduction techniques like Principal Component Analysis (PCA) can be used in order to get a set of reduced vectors from the set of vectors.

In another implementation, other dimensionality reduction methods, such as t-SNE (t-distributed Stochastic Neighbor Embedding) or UMAP (Uniform Manifold Approximation and Projection), can also be used in order to get a set of reduced vectors from the set of vectors.

Once a set of reduced vectors is obtained, the clustering techniques previously mentioned can also be applied on this set.

Then, when the clustering step 114 has been performed/executed by a device, the vectors or reduced vectors are gathered into clusters. The corresponding binary files associated with the vectors in a given cluster are considered as near duplicate binary files (in the sense that these binary files should be assumed to be fairly similar with small changes to them), as the parameters involved in the clustering step have been chosen/selected to achieve this goal.

In a step 116, instead of using the vectors/reduced vectors representing the binary files, the device is going to use the binary files themselves in further processing. More precisely, the device is going to use the near duplicate binary files from a given cluster in order to determine in a step 116 a list or a sequence of bytes deltas (as well as others information related to the positions of byte deltas in the binary files), where a byte delta is a sequence of bytes present in one binary file, but not in the other binary file. Hence, in a sense, a sequence of bytes deltas is a sequence of bytes sequences.

In one implementation, for each cluster identified by the clustering 114, the device selects each pair of binary files that belong to a given cluster. In a variant, only some binary files that are close to each other (according to a distance measure) are selected to define pairs of binary files (to reduce the complexity of the method). Then, for a given pair of binary files, a device determines the bytes deltas between these two binary files (i.e. between a binary file A, and a binary file B). In one embodiment, this process is reiterated for each pair of binary files from a cluster. In a variant, a maximum number of comparisons for a binary file can be defined (to limit the complexity of the processing). In another embodiment of the disclosure, the device can be configured to store byte deltas according to their size (i.e. the number of bytes in a byte delta). For example, in one implementation, a sequence of byte deltas that is too long may be difficult to handle in the following (to train a machine learning, etc.). Hence, some byte deltas from a sequence of byte deltas can be discarded (i.e. not stored). In another implementation, delta bytes that have their sizes belonging to a range of integers [1; 256] are stored. In a variant, long byte deltas (i.e. a byte delta with a size greater than a threshold value) are reduced by using an N-gram hash function or a similar function.

In one embodiment of the disclosure, the following information can be recorded for a given pair: the identifiers of the binary files A and B; a first list of positions of bytes deltas comprising the positions of the bytes comprised in the binary file A, but not in the binary file B, and a second list of positions of bytes deltas comprising the positions of the bytes comprised in the binary file B, but not in the binary file A. Therefore, for a given pair of binary files (binary file A and binary file B), the device can output a list of all differing byte positions, along with the byte values at those positions in both binary files (i.e. the bytes delta associated with the binary file A, and the bytes delta associated with the binary file B).

For example, let's assume that the binary file A comprises a repetition of the following pattern of bytes (in hexadecimal): [0xFA, 0xFB, 0xFC, 0xFD, 0xFE, 0xFF], and that the binary file B comprises a repetition of the following pattern of bytes (in hexadecimal): [0xFA, 0xFB, 0xFC, 0xFC, 0xFE, 0xFF], and that the binary file C comprises a repetition of the following pattern of bytes (in hexadecimal): [0xFA, 0xFB, 0xFC, 0xFC, 0xFE, 0xFA]. Then, the device determines a first bytes deltas, associated with the binary file A, between the binary files A and B which is the repetition of the following pattern of bytes: [-, -, -, 0xFD, -, -], where the symbol "-" means that the bytes are the same in this position in the binary files. The device is going to store, for the file A, this first bytes deltas which is a repetition of the byte 0xFD (the number of times corresponding to the repetition of the pattern of bytes) and their positions such as (4, 10, 16, etc.), which is a list of positions of the bytes comprised in the file A, but not in the file B. Indeed, the symbol "-" are discarded in the storage of the information. The device also determines another bytes deltas, associated with the binary file B, between the binary files A and B which is the repetition of the following pattern of bytes: [-, -, -, 0xFC, -, -], where the symbol "-" means that the bytes are the same in this position in the binary files. The device is going to store, for the binary file B, this bytes deltas which is a repetition of the byte 0xFC (the number of times corresponding to the repetition of the pattern of bytes) and their positions such as (4, 10, 16, etc.). In one embodiment, for a given pair of binary files, the device determines in a single process, all this information (the bytes deltas associated with each of the two binary files, and the list of positions of differences). It should be noted that the binary file A is also associated with a second bytes deltas (resulting from the comparison between the binary files A and C) which is the repetition of the bytes [0xFD, 0xFF], and their positions such as (4, 6, 10, 12, etc.), which is a list of positions of the bytes comprised in the file A, but not in the file C.

Therefore, for a given binary file from a cluster, a list (or sequence) of bytes deltas and a list of positions (related to these bytes deltas) are stored. The number of bytes deltas in a list (or sequence) associated with a given binary file is a function of the number of comparisons done between this binary file and other binary files from the cluster.

In order to perform the step 116, several methods can be used to achieve a same result (but with different complexities in terms of processing time, operations performed, or memory used).

In one implementation, a naïve method is executed: it comprises the reading of the two binary files byte-by-byte: when there is a difference, the byte values and their positions are stored; for example, when a first binary file and a second binary file are compared in this way, a bytes delta associated with the first file (with a list of positions) and a bytes delta associated with the second file (with a list of positions) are obtained.

In the case that the two binary files haven't got the same size/length, the device stops the processing once the last byte of the smaller of the two files has been compared. In a variant, the remaining bytes in the longer file can be stored in the corresponding bytes delta.

In another implementation, instead of a byte-by-byte approach, the comparison is done between chunks of the binary files. For example a chunk can comprise 64 bytes, or 256 bytes, or more (such as 4096 bytes). If the binary files don't have the same size, the remaining bytes in the longer binary file can be stored in the corresponding bytes delta.

In one implementation, the comparison starts with a "high" size value for a chunk. Once, a first difference occurs (i.e. there is a difference between the compared chunks), the device modifies (reduces) the size value for the following chunks to be processed in the comparison process for determining the bytes deltas (and their positions).

In a variant, the comparison starts with a "small" size value for a chunk. If there are no differences between the bytes of these chunks (meaning that there are no bytes deltas), the size value of the chunk is increased for the following of the scanning of the binary files. For example, the size can be doubled, and so on until the occurrence of a first difference is detected. Then, it can be reduced as explained previously.

In one implementation, the comparison of the chunks relies on the use of hash functions (i.e. the hashes of the chunks are compared; if they are different, this means that at least one byte in the two compared chunks differs).

The step 116 can rely on the split of binary files into "lines" to be compared with other "lines" from binary files from a same cluster. Indeed, the step 116 can use a method to extract small, approximately uniformly-sized chunks (i.e. the lines) from the files in order to simplify the byte delta extraction, as the comparison of "small" lines is easier to perform. The split process, performed by the device, determines the average number of occurrences of each of the possible bigrams in the binary files from a cluster (i.e. for a given bigram (such as (0xFF, 0xFA)), an average number is associated with it). Then, a list of the K-most frequent bigrams is determined for the binary files from a cluster, where K is an integer. For each of these bigrams, the device uses it as a delimiter to split the original file into lines, and find the average and standard deviations of the line lengths. Typically, a low average with low standard deviation would be chosen as a delimiter that reasonably splits a file into more uniformly smaller lines that a diffing method can later be applied to. In a variant, the device can use the median or quantiles to determine the best choice of delimiter. In another embodiment, a distinct delimiter per cluster of files can be used to reduce the likelihood of very large lines forming. In one implementation, variant, N-grams can be used instead of bigrams to perform the split into lines. In another variant, more than one delimiter can be used for the splitting to increase the chance of having smaller lines.

Then, a comparison of the lines is done between two binary files in order to generate bytes deltas (and the corresponding positions). The device can compare the lines either in parallel or sequentially. In addition, the device can perform the comparison of two lines either with a byte-by-byte approach or by using chunks which are much smaller than the size of a line.

In another embodiment, the step 116 relies on the use of rolling hash algorithms (i.e. hash functions designed to efficiently calculate the hash of a sliding window over bytes stream, such as the Rabin-Karp hash function or the Buzhash function) in order to get the two bytes deltas when two binary files are selected and compared.

Hence, once step 116 has been completed, binary files from the set of binary files are associated with sequences of bytes deltas (with related position information). Such information is stored in the device. This information can also be stored with labels associated with the binary files.

For example, at the end of execution of the method of FIG. 1, a given binary file from the set of binary files can be stored with information such as a sequence of bytes deltas (i.e. a sequence of lists of bytes), with their positions, and/or labels (such as a score obtained from a trained machine learning classifier, or a categorial label such as "malicious" or "non-malicious", or a more precise label such as a name of malware).

In one embodiment, it is possible to assign, for each bytes delta, one or several labels. For example, for a given binary file in a cluster, a concatenation or list or sequence of bytes deltas resulting from the comparison of the given file with each of the other binary files from this cluster is stored. But, based on the label associated with each of the other binary files, it is possible to characterize a bytes delta.

For example, if the given binary file (with a "non-malware" label) is compared with a binary file from the cluster which is also considered as a non-malware (via a label associated with it), the bytes delta is defined as a benign bytes delta for this given binary file.

if the given binary file (with a "malware" label) is compared with a binary file from the cluster which is considered as a non-malware (via a label associated with it), the bytes delta is defined as a malign bytes delta for this given binary file.

if the given binary file (with a "non-malware" label) is compared with a binary file from the cluster which is considered as a malware (via a label associated with it), the bytes delta is defined as a benign bytes delta for this given binary file.

if the given binary file (with a "malware" label) is compared with a binary file from the cluster which is considered as a malware (via a label associated with it), the bytes delta is defined as an obfuscation bytes delta. In a variant, this bytes delta can also be indicated as a malign bytes delta.

The information related to one of these three possibilities ("benign bytes delta", "malign bytes delta", and "obfuscation bytes delta") is encoded as a label. This label is stored by the device with the corresponding bytes delta. Such label can be either a numerical value or a categorial value.

It should be noted that, in a variant, a clustering of the binary files can be done without vectorizing the binary files. Indeed, instead of performing the steps 110 and 114 (by using vectors associated with the binary files), a trained cross-encoder model (which is a type of machine learning model that evaluates a pair of binary files jointly to determine a relationship or score between them) can be used. Indeed, based on the outputs of a trained cross-encoder mode (which characterizes the similarity between binary files), it is possible to determine clusters of binary files. Then, the step 116 can be done to determine bytes deltas associated with the binary files.

Figure 2:
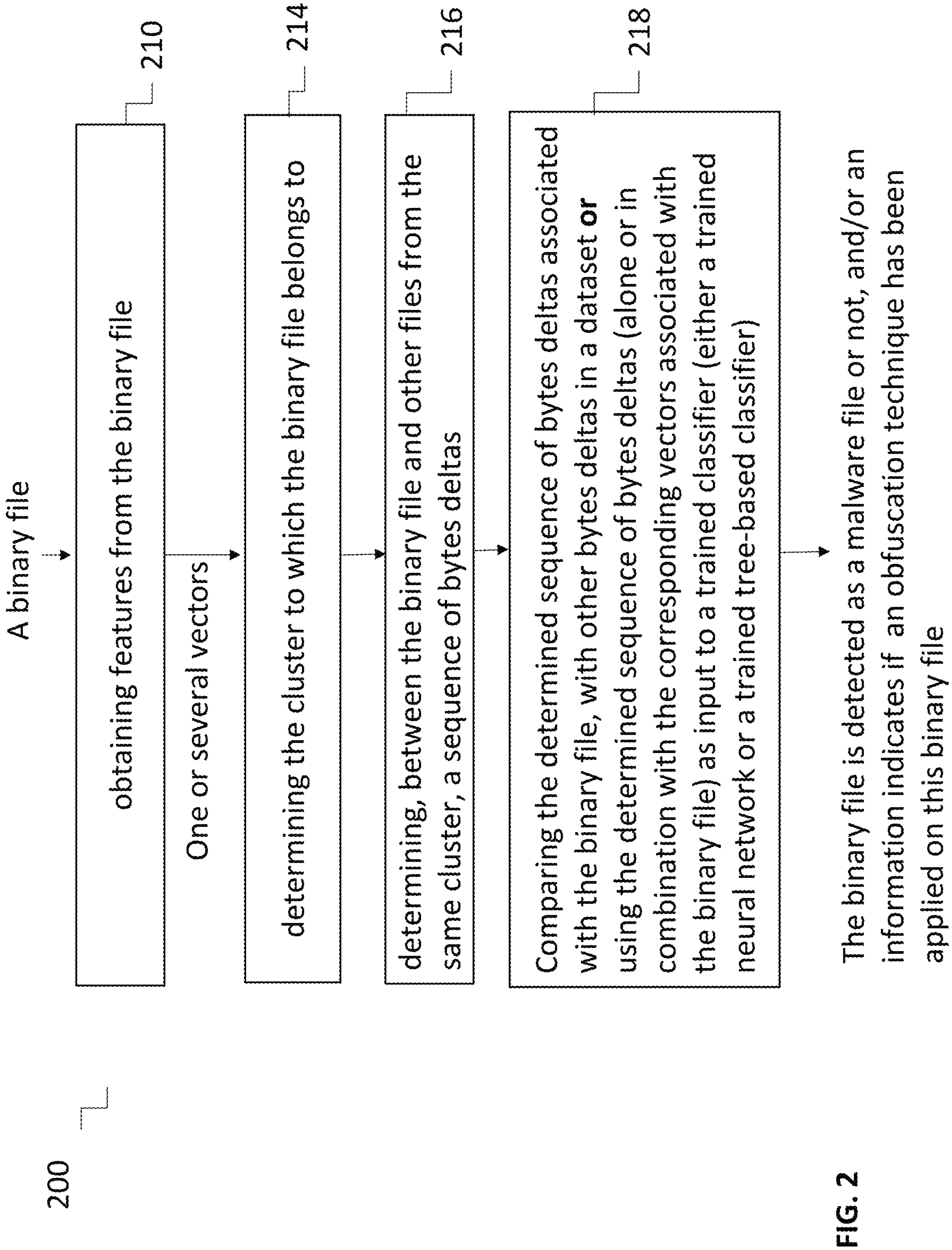
FIG. 2 is a flowchart showing an example method for determining if a given binary file is a malware or not, and/or if an obfuscation technique has been applied on this given file, according to an implementation.

FIG. 2 is a flowchart showing an example method 200 for determining if a given binary file is a malware or not, and/or if an obfuscation technique has been applied on this given file, according to an implementation.

A device, which has access to a given binary file, performs in a step 210 (which is similar to the step 110) a processing that generates one or several vectors associated with this given binary file. These vectors can be concatenated in order to define a vector associated with the given binary file.

Then, the device can have access to a set of clusters determined as in the step 114. It determines in a step 214 the cluster to which the vector associated with the given binary file (and therefore by extension the given binary file) belongs to. In one embodiment, the device gets a set of centroid vectors (i.e. one centroid vector per cluster).

Based on a distance measure, a similarity between the centroid vectors and the vector associated with the given binary file is determined. The vector associated with the given binary file is considered as belonging to the cluster whose centroid vector is closest to it (according to the distance measure).

Then, once the device has identified the cluster to which the given binary file belongs to, it executes, in a step 216, a process for determining, between the given binary file and other files from the same cluster, a sequence of bytes deltas (with their positions), which is associated with the given binary file. The step 216 uses operations similar to the ones performed in the step 116 (but for just one given binary file). In one embodiment, in order to limit the number of pairs to be considered (i.e. the number of binary files from the cluster to be compared with the given binary file), for computational complexity reasons, only the binary files, from the cluster, whose corresponding vectors (as obtained from the execution of step 210) are close to the vector representing the given binary file, are selected for determining bytes deltas for the given binary file. In one embodiment, only one bytes delta is determined for the given binary file.

In one implementation, the device uses in a step 218 the sequence of bytes deltas (and related information such as the positions) in order to detect if some bytes deltas from the sequence can be considered as obfuscation bytes deltas or malign bytes deltas. If this is the case, the given file is considered risky (as it is potentially a malware file or that an obfuscation process has been used on it).

In one embodiment, the device uses in a step 218 the sequence of bytes deltas (and related information such as the positions) as an input of a trained machine learning model to detect obfuscation bytes deltas or malign bytes deltas in the sequence.

In another embodiment, the device can generate a vector from the sequence of bytes deltas (and their positions). This vector can then be used as an input to another trained machine learning model in the step 218 to detect the presence of obfuscation bytes deltas or malign bytes deltas. For example, in one implementation, the vectors can be determined by using a locality-sensitive hashing (LSH) on a bytes deltas.

In one implementation, the device can determine a vector from the concatenation of the given binary file with its sequence of bytes deltas (and their positions). Then, this vector is provided to an appropriate trained machine learning model for classification purpose.

In another implementation, the device can determine a vector for a given binary file (for example by using the step 210), and then, it can concatenate this vector with either directly the sequence of bytes deltas for the given binary file or with a vector derived from the sequence of bytes deltas for the given binary file. Therefore, the device generates a "new" vector that is provided to an appropriate trained machine learning model for classification purpose.

Hence, based on the use of the bytes deltas associated with a given binary file, it is possible to characterize this given binary file.

It should be noted that, in a variant, it is possible to determine to which cluster the given binary file belongs to without vectorizing the binary files. Indeed, instead of performing the step 210, a trained cross-encoder model can be used. In this embodiment, for each cluster, one or more binary files are available (as representative elements of the corresponding cluster), and the given binary file with the representative elements are provided as inputs of the trained cross-encoder model to determine which cluster the given file belongs to. Then, the steps 216 and 218 can be executed.

In one embodiment, a cluster is associated with one to ten representative elements.

Hence, the method 200 enables the detection of new malwares (on which obfuscation techniques have been used). Indeed, through the detection of obfuscation patterns (related to the byte deltas) even new malwares that have never been detected before can be identified as such.

FIG. 3 is a flowchart presenting an example method 300 for generating a vector from a binary file.

More precisely, given a binary file and according to a scanning process described in the following, several elements made up of $N_1$-bytes from the binary file are selected, with $N_1$ being an integer greater or equal to one. There are several ways to carry out this scanning and selecting process 301.

According to one implementation, the scanning and selecting process 301 depends of the structure of the binary file. Indeed as different binary file types have different formats and structures, the scanning and selecting process 301 can comprise an additional process for detecting the nature of the file in order to classify it as a PE file or an ELF file or another type of files. Then, it enables the order in which the scanning occurs. For example, if the binary file is an ELF file, according to one embodiment of the invention, elements made up of $N_1$-bytes are obtained by scanning the ELF Header from the beginning of the ELF header to the end of the ELF header. If the ELF header size is not a multiple of $N_1$, at the end of the scanning of the ELF header, zero bytes can be added to get an element of $N_1$-bytes. In parallel with or following this processing, the scanning of the ELF data and the selection of elements of $N_1$-bytes from the ELF data is done. In one embodiment, the scanning starts from the beginning of the ELF data until the end of the ELF data. In a variant, the scanning and selection is done based on the different types of sections. For example, in one embodiment, the process starts from the section header table, and then process bytes from the .data section, the .bss section, the .rodata section, the .symtab section, the strtab section, the .rel.data section, the .text section and the .rel.text section in this order. In a variant, other orders of processing of the sections may be considered. In addition, in a variant, some bytes that have no interest can be discarded from the scanning and selecting step. Indeed, it is unlikely that important information about the dangerousness of the file is included in sections such as the .comment section or .note section from the ELF data. These sections respectively contain optional comments, metadata and notes/annotations.

A similar process can be performed on other types of binary files (i.e. having a specific scanning order of bytes depending on the structure of the binary file induced by its type). For example, the components of an apk file can be scanned according to a specific order.

According to one implementation, the scanning and selecting process 301 is done without considering the structure of the binary file. In this variant, it enables a binary file to be processed quickly. Therefore, in this embodiment of the invention, the binary file is processed as a whole. For example, starting from the beginning of the binary file, a number $N_1$ of bytes are selected at the beginning of the process, and then, according to a sliding window of value equal to $N_1$, other bytes are selected each time by group of $N_1$ of bytes. This process is repeated until all the bytes in the binary file have been scanned. Once again, if the binary file size is not a multiple of N either zero bytes are added to have a final group of $N_1$ bytes, or the number of bytes in the final group of bytes is less than $N_1$ bytes and will be used as it is in subsequent processing. In a variant, the starting point of the scanning process is not the beginning of the binary file but the end of the binary file. This means that the bytes in the binary file are scanned and selected in the opposite direction of the one of the previous embodiment. In other variants, the starting point of the scanning and selection process is defined as a given position in the binary file. In this case, the bytes can be scanned towards the end of the binary file. Once the end of the file is reached, the other unscanned bytes are scanned starting from the beginning of the binary file (this scanning and selecting process can be seen as a cyclic process). In another variant, if the starting point of the scanning and selection process is defined as a given position in the binary file, the bytes can be scanned in the opposite direction compared to the previous embodiment (i.e. towards the beginning of the binary file). Here again, once the beginning of the binary file is reached, the scanning and selection process continues by starting from the end of the binary file. These examples are not exhaustive and one skilled in the art could use other ways of scanning and selecting bytes in the binary file in the spirit of the described examples.

In one embodiment of the disclosure, each time that $N_1$ bytes are selected, these are supplied as input to a hash function. The output of the hash function is positioned in a vector of data (by concatenating the different outputs). This vector is the result of the obtaining step 303. Hence, according to this embodiment, obtaining a vector is done on the fly. In one variant, intermediate memory buffers may be used to prepare the data to be hashed by a hash function. Both approaches enable the determination 302 of a sequence of hash values.

Different types of hash functions can be used; for example, a non-cryptographic hash function such as the Pearson hash function or the MurmurHash function can process inputs of $N_1$ bytes, as selected previously. The size of the output of the Pearson hash function is typically 8 bits (1 byte). Therefore, the output of the Pearson hash function is just a number between 0 and 255. However, it is possible to generate larger hash values (16-bit, 32-bit, 64-bit, etc.) by running the Pearson algorithm multiple times with different initial conditions.

In addition, the most common versions of MurmurHash are MurmurHash2 and MurmurHash3. They can generate outputs of 32-bit, 64-bit, and even 128-bit sizes.

In another variant, two hash functions can be used to process a same input of $N_1$ bytes. According to this embodiment, a truncation of the concatenation of the two hash values can also be performed in order to limit the size of the hash values. The truncation is defined as the output result, and is used to define/generate the sequence of hashes. For example, given an input of $N_1$ bytes, a Pearson hash function outputting a single byte as result can be used. Then, a Pearson hash function, with a different permutation table, outputting also a single byte as result can be used on the same input of $N_1$ bytes. Therefore, for a given input of $N_1$ bytes, two bytes (i.e. 16 bits) are obtained from the use of two hash functions. However, instead of using the two bytes in a sequence of hashes, a truncation can be performed. Indeed, in one embodiment, the lower 12 bits from the 16 bits are kept. These 12 bits define a hash value. In a variant, another selection function can be used to extract a number of bits amongst the 16 bits. For example, the selection function can take the highest 12 bits from the 16 bits. In a variant, the two most significant bits and the two least significant bits are discarded by the selection function in order to get the 12 remaining bits. The selected bits correspond to the hash value associated with the given input of $N_1$ bytes.

In one embodiment, the number $N_1$ is an integer that belongs to a range from 2 to 15.

In a variant, before executing the scanning and selecting step, a preprocessing step can be performed. Such preprocessing may remove zero bytes comprised in the binary file. Indeed, a zero byte can be a special character that appears after every byte (either due to syntax/structure requirements (for aligning sections or instructions for example) or for integrity purposes). Hence, these zero bytes can be considered in some way as noise, and may prevent the extraction of truly relevant information. In a variant, the preprocessing step may remove other byte values such as a value of 0x90, in hexadecimal format, which corresponds to a NOP ("no operations") instruction in x86, or other values related to debugging purposes.

According to one implementation, several vectors can be generated for a given binary file. Indeed, in this embodiment, once a first vector has been generated, another one can be generated by reiterating the processing with a value $N_2$ different of $N_1$. It should be noted that the generation of these vectors can be done in parallel.

Therefore, in a variant, given a binary file, it is possible to generate from 2 to 10 vectors by using several different values for $N_1$ and by repeating the described process.

In a variant, a vector can be obtained in the step 303 as follows: once all the hash values have been obtained or determined, a histogram vector is determined. The histogram vector is a numerical representation of a histogram of the hashes, which is a graphical representation of the distribution of the hashes. Hence, this vector comprises, for each possible hash values defined by a position in the vector, a number that corresponds to the frequency or count of hashes having this value.

In a variant, several histogram vectors can be obtained for a given binary file (by repeating the scanning and selection process with different values of $N_1$ for a given binary file).

Therefore, the vector obtained by the method described in FIG. 3 can be either a histogram vector as explained previously, or a vector being a concatenation of vectors of hash values as also explained previously. In a variant, it can also be a concatenation of histogram vectors.

In the previous examples, the scanning and extraction 301 focuses on the bytes from the binary file. However, in a variant, instead of using bytes, the scanning and extraction step can be done on nibbles (i.e. groups of 4 bits).

Figure 4:
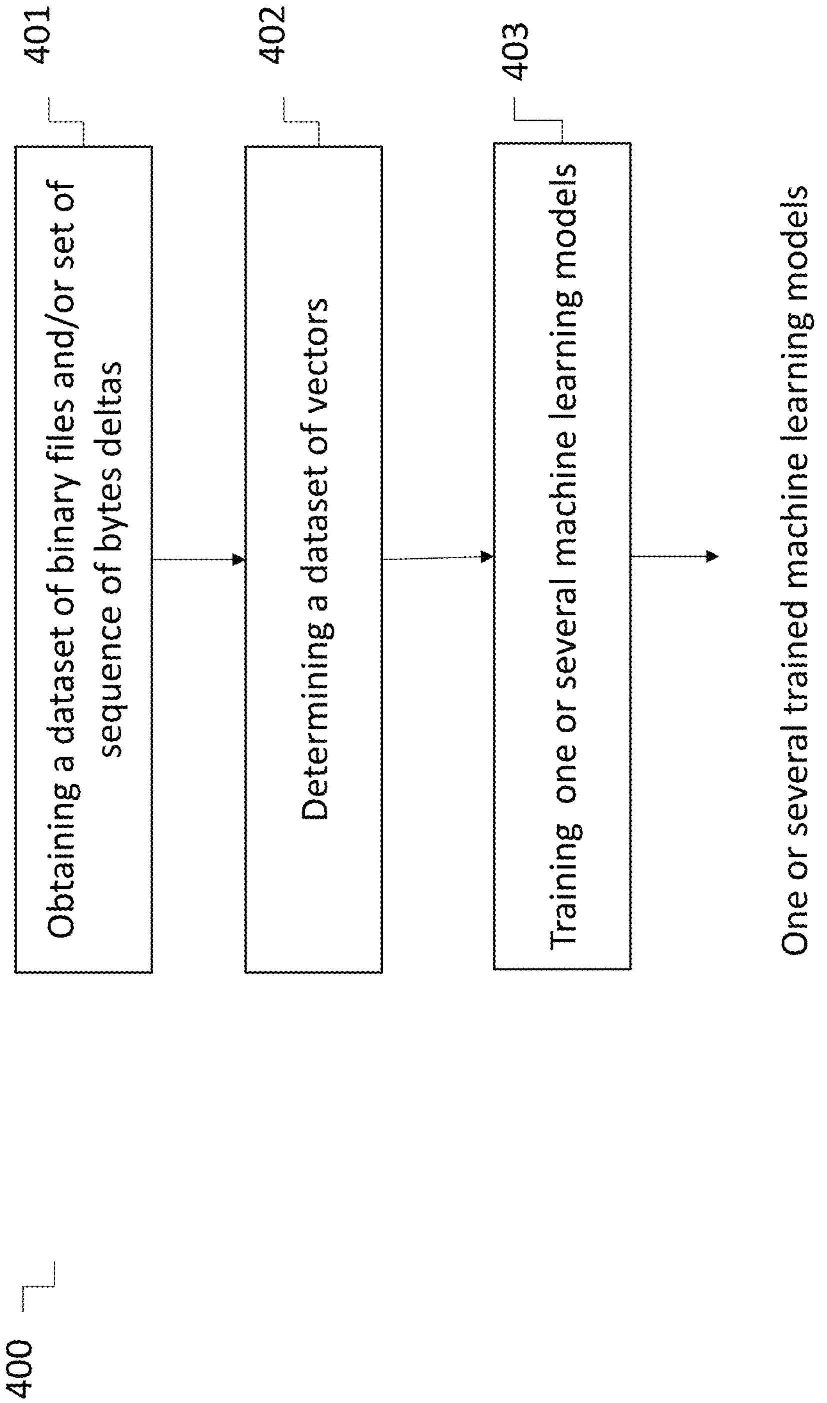
FIG. 4 is a flowchart presenting an example method for training a machine learning model, the trained machine learning model being then used in the method described in FIG. 2.

According to one implementation, FIG. 4 is a flowchart presenting an example method 400 for training a machine learning model to be used in the context described in FIGS. 1-2.

It is commonly known that machine learning models are trained using a process that involves feeding them large amounts of data and allowing them to learn patterns and relationships within that data.

In a step 401, a device obtains a dataset of binary files comprising numerous different files. In one embodiment of the disclosure, several datasets can be obtained, and each dataset of binary files gather files of the same type (i.e. for example a first dataset with only ELF files, a second dataset with only EXE file, etc.). In a variant, the device obtains rather a dataset of binary files, wherein for a given binary file, a sequence of bytes deltas (with related position information) is accessible/available. In a variant, the device obtains a dataset of sequence of bytes deltas associated with identifiers (or hashes) of binary files, a bytes delta having (or not) a label associated with it.

Whatever the type or nature of the dataset (i.e. comprising binary files and/or sequence of bytes deltas, etc.), a dataset of vectors is determined by the device from this dataset in order to train a machine learning model either according to a supervised learning approach or an unsupervised learning approach for a specific purpose (such as detecting that a binary file is a malware, or such as obtaining from bytes deltas information related to an associated binary file, etc.).

Once the step 402 has been executed, a data splitting process can be executed in order to divide a given dataset of vectors into a training set and a testing set. The training set is used to train the model, while the testing set is used to evaluate its performance.

According to one embodiment of the disclosure, different model can be chosen to be trained. For example, a feedforward neural network (FNN), also called a multi-layer perceptron (MLP), can be used. In a variant, a Convolutional Neural Networks (CNNs) can be chosen to be trained. In another variant, Recurrent Neural Networks (RNNs) or Long Short-Term Memory (LSTM) Networks can be chosen. Moreover, other architectures relying on the use of transformers or hybrid approaches relying on the use of an MLP combined with autoencoders can be chosen. Of course, the way in which the vectors are formatted must be modified according to the nature of the models to be used. In addition, the way in which the parameters and hyperparameters of each model are chosen is not described in the present document. But one skilled in the art would understand that based on the results of the training of these models, modification of these parameters and hyperparameters is done to obtain better results. Indeed, in order to determine these parameters and hyperparameters, comparison of results has to be done. Factors such as the number of layers, the number of neurons per layer, the activation functions, and the optimization algorithm has an important impact on the behavior of a model. This is the purpose of fine tuning which is beyond the scope of the present document.

Once a model architecture is chosen, the model training 403 is performed by using the training dataset, the use of a loss function that measures the discrepancy between the model's predictions and the true values, and the use of an optimization algorithm (e.g., gradient descent) to update the parameters (weights) iteratively to minimize the loss function. Indeed, during the model training, the internal parameters (weights and biases) are modified in order to minimize the difference between the predictions of the model and the actual values in the training data.

The model training 403 further comprises an evaluation step that evaluate the trained model on the testing dataset to assess its performance. Based on the results, either model refinement can be done (i.e. such as the adjustment of the hyperparameters of the model) or the training process can stop at this stage if the performance metrics fulfill a stopping criteria.

Figure 5:
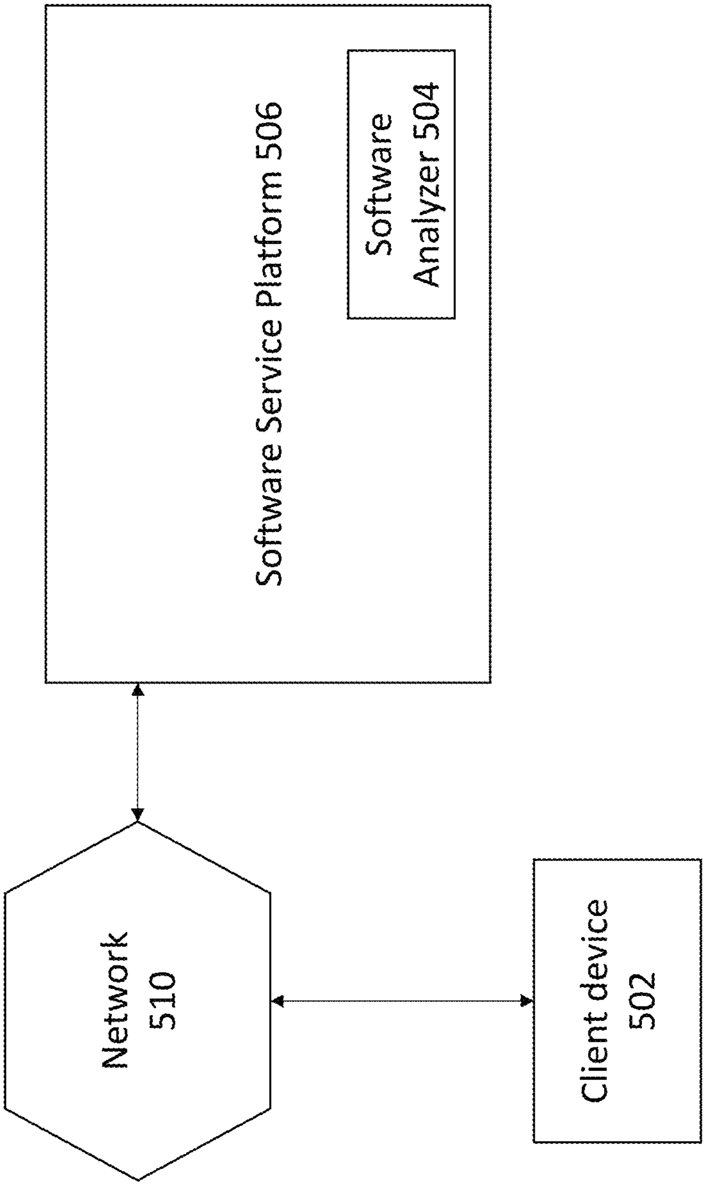
FIG. 5 depicts a schematic diagram showing an example system that provides a malware detection/obfuscation detection technique according to an implementation.

In one embodiment, once a trained machine learning model is obtained/generated, it can be deployed to a software service platform described in FIG. 5.

For example, the trained machine learning model mentioned in the step 218 can be obtained by the execution of the method of FIG. 4.

The training process and deployment of a trained machine learning model can be reiterated regularly based on parameters of a security policy, the parameters defining for example a time range or frequency at which to carry out the training. In other case, a security alarm can be the event that trigger the launch of a new training of the one or several models.

Similarly to the process described in connection with FIG. 4, it is possible to train a tree-based classifier based on the split of the vectors into a training dataset and a testing dataset.

One or several trained tree-based classifiers can be obtained/generated, and then deployed to the software service platform described in FIG. 5.

In a variant, the software service platform described in FIG. 5 can run both tree-based classifiers and trained machine learning models to assess a given file. For example, the step 218 can comprise the execution of a trained tree-based classifier.

FIG. 5 depicts a schematic diagram showing an example system that provides a malware detection/obfuscation detection technique according to an implementation. More precisely, the system 500 includes a software service platform 506 that is communicatively coupled with a client device 502 over a network 510. The client device 502 represents an electronic device that provides a binary file to be analyzed. In some cases, the client device 502 can send the binary file to the software service platform 506 for a malware detection/obfuscation detection analysis. In some cases, the software service platform 506 can send the output of the malware and/or obfuscation detection analysis to the client device 502.

The software service platform 506 represents an application, a set of applications, software, software modules, hardware, or any combination thereof, that detects malware files and/or obfuscated files. The software service platform 506 can be an application server, a service provider, or any other network entity. The software service platform 506 can be implemented using one or more computers, computer servers, or a cloud-computing platform. The software service platform 506 can be used to run trained machine learning models that are used in a malware detection process and/or an obfuscation detection process. In a variant, the software service platform 506 can also perform the training process discussed in FIG. 4 and associated descriptions. The software service platform 506 includes a software analyzer 504. The software analyzer 504 represents an application, a set of applications, software, software modules, hardware, or any combination thereof, that performs data preprocessing on a received binary file. In some implementations, the software analyzer 504 can generate a binary file from a source file transmitted by the client device 502. In a variant, both the software analyzer 504 and the software service platform 506 are executed on the client device 502 itself. Indeed, more and more client devices, thanks to technological developments, are capable of running trained machine learning models locally. For example, iPhones that can be viewed as client devices are suitable for running machine learning models locally as they provide a core machine learning framework, a dedicated chip component such as the Apple neural engine (ANE) optimized for performing machine learning tasks.

Turning to a general description, the client device 502 may include, without limitation, any of the following: endpoint, computing device, mobile device, mobile electronic device, user device, mobile station, subscriber station, portable electronic device, mobile communications device, wireless modem, wireless terminal, or another electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example system 500 includes the network 510. The network 510 represents an application, set of applications, software, software modules, hardware, or combination thereof, that can be configured to transmit data messages between the entities in the example system 500. The network 510 can include a wireless network, a wireline network, the Internet, or a combination thereof. For example, the network 510 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

While elements of FIG. 5 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

Figure 6:
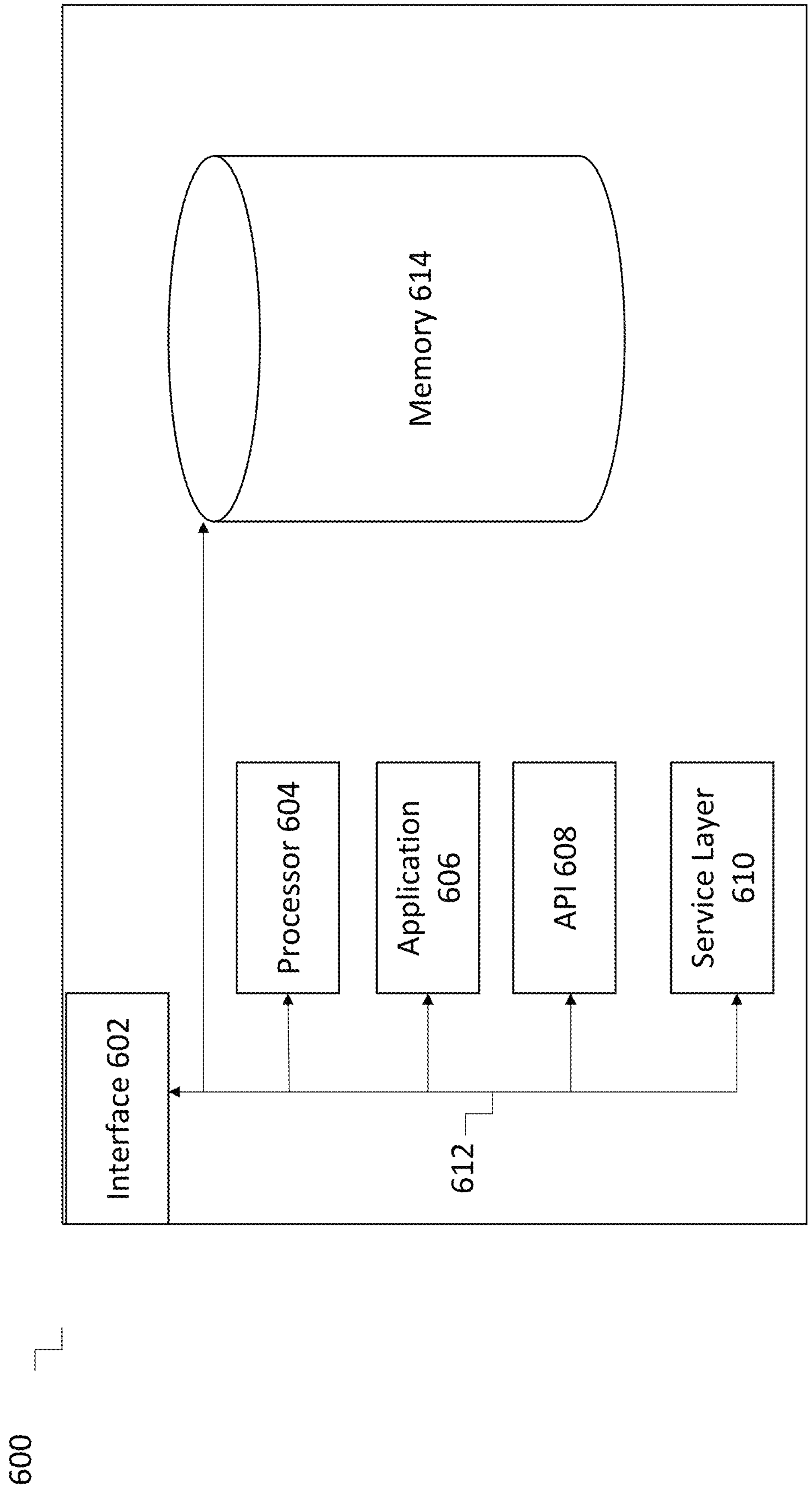
FIG. 6 illustrates a high-level architecture block diagram of a computer according to an implementation.

FIG. 6 illustrates a high-level architecture block diagram of a computer 600 according to an implementation. The computer 600 can be implemented as the client device 502, the software service platform, or any combinations thereof. The computer 600 can also be used to implement the operations discussed in FIGS. 1-4. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

In some cases, the steps of FIGS. 1-4 can be implemented in an executable computing code, e.g., C/C++ executable codes. In some cases, the computer 600 can include a standalone Linux system that runs batch applications. In some cases, the computer 600 can include mobile or personal computers.

The computer 600 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 600 can serve as a client, network component, a server, a database, or other persistency, and/or any other components. In some implementations, one or more components of the computer 600 may be configured to operate within a cloud-computing-based environment.

At a high level, the computer 600 is an electronic computing device operable to receive, transmit, process, store, or manage data. According to some implementations, the computer 600 can also include or be communicably coupled with an application server, e-mail server, web server, caching server, streaming data server, business intelligence (BI) server, and/or other server.

The computer 600 can collect data of network events or mobile application usage events over network 510 from a web browser or a client application, e.g., an installed plugin. In addition, data can be collected by the computer 600 from internal users (e.g., from a command console or by another appropriate access method), external or third parties, other automated applications, as well as any other appropriate entities, individuals, systems, or computers.

Each of the components of the computer 600 can communicate using a system bus 612. In some implementations, any and/or all the components of the computer 600, both hardware and/or software, may interface with each other and/or the interface 602 over the system bus 612 using an Application Programming Interface (API) 608 and/or a service layer 610. The API 608 may include specifications for routines, data structures, and object classes. The API 608 may be either computer language-independent or -dependent and refer to a complete interface, a single function, or even a set of APIs. The service layer 610 provides software services to the computer 600. The functionality of the computer 600 may be accessible for all service consumers using this service layer. Software services, such as those provided by the service layer 610, provide reusable, defined business functionalities through a defined interface. For example, the interface may be software written in JAVA, C++, or other suitable languages providing data in Extensible Markup Language (XML) format or other suitable format. While illustrated as an integrated component of the computer 600, alternative implementations may illustrate the API 608 and/or the service layer 610 as stand-alone components in relation to other components of the computer 600. Moreover, any or all parts of the API 608 and/or the service layer 610 may be implemented as child or sub-modules of another software module, enterprise application, or hardware module without departing from the scope of this disclosure.

The computer 600 includes an interface 602. Although illustrated as a single interface 602 in FIG. 6, two or more interfaces 602 may be used according to particular needs, desires, or particular implementations of the computer 600. The interface 602 is used by the computer 600 for communicating with other systems in a distributed environment connected to a network (whether illustrated or not). Generally, the interface 602 comprises logic encoded in software and/or hardware in a suitable combination and operable to communicate with the network. More specifically, the interface 602 may comprise software supporting one or more communication protocols associated with communications such that the network or interface's hardware is operable to communicate physical signals within and outside of the computer 600.

The computer 600 includes at least one processor 604. Although illustrated as a single processor 604 in FIG. 6, two or more processors may be used according to particular needs, desires, or particular implementations of the computer. Generally, the processor 604 executes instructions and manipulates data to perform the operations of the computer 600. Specifically, the processor 604 executes the functionality disclosed in FIGS. 1-4.

The computer 600 also includes a memory 614 that holds data for the computer 600. Although illustrated as a single memory 614 in FIG. 5, two or more memories may be used according to particular needs, desires, or particular implementations of the computer 600. While memory 614 is illustrated as an integral component of the computer 600, in alternative implementations, memory 614 can be external to the computer 600.

The application 606 is an algorithmic software engine providing functionality according to particular needs, desires, or particular implementations of the computer 600, particularly with respect to functionality required for anomaly detection. Although illustrated as a single application 606, the application 606 may be implemented as multiple applications 606 on the computer 600. In addition, although illustrated as integral to the computer 600, in alternative implementations, the application 606 can be external to the computer 600.

There may be any number of computers 600 associated with, or external to, and communicating over a network. Furthermore, this disclosure contemplates that many users may use one computer 600, or that one user may use multiple computers 600.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a standalone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer readable media for storing computer program instructions and data can include all forms of permanent/non-permanent or volatile/non volatile memory, media and memory devices, including by way of example semiconductor memory devices, for example, random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto optical disks; and optical memory devices, for example, digital versatile/video disc (DVD), compact disc (CD) ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back end, middleware, or front end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Described implementations of the subject matter can include one or more features, alone or in combination.

For example, in an implementation, it is proposed a first feature that deals with a method for storing properties of binary files from a set of binary files, wherein the method comprises:

- obtaining features from the binary files;
- clustering the binary files based on a similarity measure between the features, wherein a cluster of binary files comprises binary files that are near duplicates to each other;
- determining for at least one pair of binary files of a given cluster, at least one sequence of bytes, a pair of binary file comprising a first binary file and a second binary file, and wherein the at least one sequence of bytes being a sequence of bytes present in the first binary file, but not in the second binary file;
- storing information related to the at least one sequence of bytes as a property of a binary file.

A second feature, combinable with any of the previous or following features, relates to a method for storing properties of binary files from a set of binary files, wherein the determining further comprises determining another sequence of bytes, wherein the another sequence of bytes being a sequence of bytes present in the second binary file, but not in the first binary file.

A third feature, combinable with any of the previous or following features, relates to a method for storing properties of binary files from a set of binary files, wherein the at least one sequence of bytes is associated with related position information indicating positions of bytes present in the first binary file, but not in the second binary file.

A fourth feature, combinable with any of the previous or following features, relates to a method for storing properties of binary files from a set of binary files, wherein the determining further comprises comparing blocks of bytes from the first binary file with blocks of bytes from the second binary file, and identifying bytes present in the first binary file, but not in the second binary file according to a comparison of hashes of blocks of bytes, and hashes being obtained from a use of one of the following hash functions: xxHash, CRC32 or BLAKE3.

A fifth feature, combinable with any of the previous or following features, relates to a method for storing properties of binary files from a set of binary files, wherein a size of blocks of bytes can be adapted during the determining based on a result of a comparing of some blocks of bytes.

A sixth feature, combinable with any of the previous or following features, relates to a method for storing properties of binary files from a set of binary files, wherein the determining further comprises splitting the first binary file and the second binary file into lines based on an average occurrence of selected bigrams of binary files of the given cluster, and comparing the lines.

A seventh feature, combinable with any of the previous or following features, relates to a method for storing properties of binary files from a set of binary files, wherein it further comprises selecting the at least one pair of binary files amongst the binary files of the given cluster according to a proximity criterion defined by a distance measure and a threshold.

An eighth feature, combinable with any of the previous or following features, relates to a method for storing properties of binary files from a set of binary files, wherein the determining is done for all the clusters obtained from the clustering.

A ninth feature, combinable with any of the previous or following features, relates to a method for storing properties of binary files from a set of binary files, wherein each binary file is associated with a label, the label being an information related to a maliciousness of a corresponding binary file, and wherein the method further comprises providing the binary files with the corresponding properties or features derived from the corresponding properties to a model to be trained, the model outputting updated labels for the binary files, the updated labels being representative of the maliciousness of the corresponding binary file.

In a variant, features previously mentioned can be implemented either in hardware or as a computer program.

In addition, the features related to a method for determining if a given binary file is a malware or not, and/or if an obfuscation technique has been applied on this given file (as mentioned in connection with the FIG. 2) can also be implemented either in hardware or as a computer program.

The previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

At last, according to an embodiment, some machine learning models can be run on Central Processing Unit (CPU) that are general-purpose processors that handle most types of computing tasks. In a variant, Graphics Processing Unit (GPU) which are specialized hardware designed for parallel computing can be used to run or train machine learning models mentioned in this document. Moreover, in a variant, Tensor Processing Unit (TPU) can be used. Therefore a device that comprises at least one of these different processors can execute part of the processes that involve the use of machine learning models.

The invention claimed is:

1. A computer-implemented method for storing properties of binary files from a set of binary files, wherein the method comprises:

- obtaining features from the binary files, wherein each binary file is associated with a label, the label being an information related to a maliciousness of the binary file;
- clustering the binary files based on a similarity measure between the features, wherein a cluster of binary files comprises binary files that are near duplicates to each other;
- for at least one pair of binary files of a given cluster:
  - generating a list of K-most frequent bigrams based on an average occurrence of possible bigrams of binary files of the given cluster;
  - selecting a custom delimiter based on the list of K-most frequent bigrams;
  - splitting a first binary file and a second binary file into lines using the custom delimiter; and
  - comparing the lines to determine at least one sequence of bytes, wherein the at least one sequence of bytes is a sequence of bytes present in the first binary file, but not in the second binary file;
- storing information related to the at least one sequence of bytes as a property of a binary file; and
- providing the property of the binary file to a machine learning model to be trained, wherein the machine learning model outputs an updated label representative of a maliciousness of the binary file.

2. The computer-implemented method of claim 1, wherein the at least one sequence of bytes comprises another sequence of bytes, wherein the another sequence of bytes being a sequence of bytes present in the second binary file, but not in the first binary file.

3. The computer-implemented method of claim 1, wherein the at least one sequence of bytes is associated with related position information indicating positions of bytes present in the first binary file, but not in the second binary file.

4. The computer-implemented method of claim 1, wherein comparing the lines comprises comparing blocks of bytes from the lines of the first binary file with blocks of bytes from the lines of the second binary file, and identifying bytes present in the first binary file, but not in the second binary file according to a comparison of hashes of blocks of bytes, and hashes being obtained from a use of one of the following hash functions: xxHash, CRC32 or BLAKE3.

5. The computer-implemented method of claim 4, wherein a size of blocks of bytes can be adapted during the determining based on a result of a comparing of some blocks of bytes.

6. The computer-implemented method of claim 1, further comprising selecting the at least one pair of binary files amongst the binary files of the given cluster according to a proximity criterion defined by a distance measure and a threshold.

7. The computer-implemented method of claim 1, wherein the generating, selecting, splitting, and comparing are performed for all the clusters obtained from the clustering.

8. A computer-readable medium containing instructions which, when executed, cause an electronic device to perform operations for storing properties of binary files from a set of binary files, the operations comprising:

obtaining features from the binary files, wherein each binary file is associated with a label, the label being an information related to a maliciousness of the binary file;

clustering the binary files based on a similarity measure between the features, wherein a cluster of binary files comprises binary files that are near duplicates to each other;

for at least one pair of binary files of a given cluster:

generating a list of K-most frequent bigrams based on an average occurrence of possible bigrams of binary files of the given cluster;

selecting a custom delimiter based on the list of K-most frequent bigrams;

splitting a first binary file and a second binary file into lines using the custom delimiter; and comparing the lines to determine at least one sequence of bytes, wherein the at least one sequence of bytes being is a sequence of bytes present in the first binary file, but not in the second binary file;

storing information related to the at least one sequence of bytes as a property of a binary file; and providing the property of the binary file to a machine learning model to be trained, wherein the machine learning model outputs an updated label representative of a maliciousness of the binary file.

9. The computer-readable medium of claim 8, wherein the at least one sequence of bytes comprises another sequence of bytes, wherein the another sequence of bytes being a sequence of bytes present in the second binary file, but not in the first binary file.

10. The computer-readable medium of claim 8, wherein the at least one sequence of bytes is associated with related position information indicating positions of bytes present in the first binary file, but not in the second binary file.

11. The computer-readable medium of claim 8, wherein comparing the lines comprises comparing blocks of bytes from the lines of the first binary file with blocks of bytes from the lines of the second binary file, and identifying bytes present in the first binary file, but not in the second binary file according to a comparison of hashes of blocks of bytes, and hashes being obtained from a use of one of the following hash functions: xxHash, CRC32 or BLAKE3.

12. The computer-readable medium of claim 11, wherein a size of blocks of bytes can be adapted during the determining based on a result of a comparing of some blocks of bytes.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for storing properties of binary files from a set of binary files, the one or more operations comprising:

obtaining features from the binary files, wherein each binary file is associated with a label, the label being an information related to a maliciousness of the binary file;

clustering the binary files based on a similarity measure between the features, wherein a cluster of binary files comprises binary files that are near duplicates to each other;

for at least one pair of binary files of a given cluster:

generating a list of K-most frequent bigrams based on an average occurrence of possible bigrams of binary files of the given cluster;

selecting a custom delimiter based on the list of K-most frequent bigrams;

splitting a first binary file and a second binary file into lines using the custom delimiter; and comparing the lines to determine at least one sequence of bytes, wherein the at least one sequence of bytes is a sequence of bytes present in the first binary file, but not in the second binary file;

storing information related to the at least one sequence of bytes as a property of a binary file; and providing the property of the binary file to a machine learning model to be trained, wherein the machine learning model outputs an updated label representative of a maliciousness of the binary file.

14. The computer-implemented system of claim 13, wherein the at least one sequence of bytes comprises another sequence of bytes, wherein the another sequence of bytes being a sequence of bytes present in the second binary file, but not in the first binary file.

15. The computer-implemented system of claim 13, wherein the at least one sequence of bytes is associated with related position information indicating positions of bytes present in the first binary file, but not in the second binary file.

16. The computer-implemented system of claim 13, wherein comparing the lines comprises comparing blocks of bytes from the lines of the first binary file with blocks of bytes from the lines of the second binary file, and identifying bytes present in the first binary file, but not in the second binary file according to a comparison of hashes of blocks of bytes, and hashes being obtained from a use of one of the following hash functions: xxHash, CRC32 or BLAKE3.

17. The computer-implemented system of claim 16, wherein a size of blocks of bytes can be adapted during the determining based on a result of a comparing of some blocks of bytes.

18. The computer-implemented system of claim 13, the one or more operations further comprising selecting the at least one pair of binary files amongst the binary files of the given cluster according to a proximity criterion defined by a distance measure and a threshold.

19. The computer-implemented system of claim 13, wherein the generating, selecting, splitting, and comparing are performed for all the clusters obtained from the clustering.

* * * * *